United States Patent [19]
Vöst et al.

[11] Patent Number: 5,047,453
[45] Date of Patent: Sep. 10, 1991

[54] PROCESS FOR PREPARING MOLDINGS BY COMPACTING AND SIMULTANEOUSLY BONDING FIBROUS MATERIAL

[75] Inventors: Walter Vöst, Bobingen; Heinz Schmelzer, Rümmelsheim, both of Fed. Rep. of Germany

[73] Assignee: Hoechst Aktiengesellschaft, Frankfurt am Main, Fed. Rep. of Germany

[21] Appl. No.: 730,384

[22] Filed: May 3, 1985

[30] Foreign Application Priority Data

May 4, 1984 [DE] Fed. Rep. of Germany ....... 3416473

[51] Int. Cl.$^5$ .............................................. C08L 3/00
[52] U.S. Cl. .................................. 523/447; 264/122; 525/113; 525/119; 525/120; 525/935
[58] Field of Search ................... 264/109, 122, 126; 523/447, 448; 525/113, 119, 120, 935

[56] References Cited

U.S. PATENT DOCUMENTS

| | | | |
|---|---|---|---|
| 2,336,797 | 12/1943 | Maxwell | 264/122 |
| 3,641,195 | 2/1972 | Ball | 525/113 |
| 3,671,615 | 6/1972 | Price | 264/122 |
| 4,016,233 | 4/1977 | Pringle | 264/122 |
| 4,339,363 | 7/1982 | Nakagima | 264/126 |
| 4,359,132 | 11/1982 | Parker et al. | 264/126 |
| 4,396,039 | 8/1983 | Klenk et al. | 425/105 X |
| 4,405,542 | 9/1983 | Greer | 264/109 |

FOREIGN PATENT DOCUMENTS 53-56228  5/1978  Japan .................. 523/448

*Primary Examiner*—Mary Lynn Theisen
*Attorney, Agent, or Firm*—Irwin M. Aisenberg

[57] ABSTRACT

Fibrous material, in particular shoddy from synthetic fiber wastes, can be compacted into thermally and acoustically insulating boards and moldings by mixing with a pulverulent adhesive comprising a hot-melt adhesive and a solid epoxy resin/curing agent system and heating the mixture under pressure in a mold to a temperature at which the hot-melt adhesive becomes liquid and the epoxy resin reacts with its curing agent.

20 Claims, No Drawings

PROCESS FOR PREPARING MOLDINGS BY COMPACTING AND SIMULTANEOUSLY BONDING FIBROUS MATERIAL

The invention relates to a process of preparing moldings by mixing fibrous material with an adhesive and keeping the mixture under pressure in a mold until the adhesive has set.

It is known to use fibrous material to prepare thermally insulating and acoustically insulating moldings, for example boards and half-shells, by treating the fibrous material with an adhesive dissolved or dispersed in water or organic solvents and compacting and heating the mixture. During the process of compaction, the water or solvent introduced together with the adhesive needs to be removed, which leads to long cycle times and high energy consumption. Moreover, the amount of adhesive which can be introduced is limited, since always roughly at least the same amount of water or solvent is introduced as well. It is therefore difficult to prepare relatively stiff moldings.

If the fibrous material is made of a thermoplastic, it is possible in principle to dispense with the adhesive and to prepare moldings by welding the fibers at certain points. Since, however, in the process of compaction the heat acts first on the surface of, say, a fiber assembly, this is also where welding takes place first, and the core layer remains unwelded, especially in the case of comparatively thick assemblies.

It has now been found that it is possible to obtain from fibrous material moldings which have very good properties by mixing the fibrous material with a pulverulent mixture of a hot-melt adhesive based on a copolymer of vinyl ester and at least one further vinyl monomer, a solid epoxy resin and a liquid or preferably solid curing agent for the epoxy resin and heating the mixture under pressure in a mold to a temperature at which the hot-melt adhesive becomes liquid and the epoxy resin reacts with its curing agent. If the curing agent used is liquid, the composition needs to be adjusted in such a way that the combination of epoxy resin, curing agent and hot-melt adhesive is solid. If desired, liquid or pasty curing agents can also be brought into a solid form by means of highly disperse surface-active silicas known per se, analogously to the method described in German Patent 2,202,907 for liquid or pasty paint auxiliaries.

Suitable hot-melt adhesives are in principle the known copolymers of vinyl esters and further vinyl monomers, preferably vinyl acetate, and ethylene. However, it is advantageous to use copolymers which additionally contain amides of acrylic and/or methacrylic acid or N-methylol compounds thereof, for example acrylamide, methacrylamide, N-methylolacrylamide and N-methylolmethacrylamide, since these crosslink when hot, if necessary after addition of metal alcoholates. These hot-melt adhesives are obtained particularly advantageously in powder form by preparing the copolymers as aqueous dispersions which are converted into the solid form by known spray-drying methods in the absence or presence of a small amount of hydrophobic silica.

The amount of vinyl monomer mixture used for copolymerization with a carboxamide is 75 to 95% by weight, preferably 85 to 93% by weight, of the total amount of monomer, the proportion of vinyl ester is at least 50% by weight, preferably 75 to 95% by weight, of the total amount of vinyl monomers, and the carboxamide is used in amounts of 5 to 20% by weight, preferably 7 to 15% by weight, based on the total amount of monomer.

The epoxide needs to be solid. Examples which are suitable are polyglycidyl ethers of diphenylolmethane or diphenylolpropane (bisphenol F or A), in particular the polyglycidyl ethers of bisphenol A having epoxy equivalent weights of about 500 to about 2,000. Suitable curing agents are in the first place solid anhydride curing agents or solid polyaminoamides. Examples of anhydride curing agents are the anhydrides of phthalic acid, tetrahydrophthalic acid, hexahydrophthalic acid and methyl derivatives thereof, trimellitic acid, pyromellitic acid, endomethylenetetrahydrophthalic acid and dodecenyl-succinic acid, but preferably the bis-ester of trimellitic acid with diols such as ethylene glycol and propylene glycol. Polyaminoamides are reaction products of aliphatic fatty acids (16 to 22 carbon atoms) with polyamides such as diethylenetriamine, triethylenetetramine and the like. This definition includes dimeric, trimeric or tetrameric fatty acids.

Epoxy resin and curing agent are generally used in a weight ration of 70-90:10-30, preferably 75-85:15-25, parts.

The adhesive mixture contains hot-melt adhesive and epoxy resin/curing agent mixture in amounts of about 60-85 to 15-40, preferably 65-80, to 20-35, per cent by weight, the general rule being that the higher the epoxy resin content the stiffer the moldings produced.

The hot-melt adhesive can have added to it metal compounds of a dihydric alcohol of 2 to 6 carbon atoms, in order to increase the degree of crosslinking. The metal atom in the crosslinking substances is for example zinc, magnesium, boron or titanium, but preferably aluminum. The metal compounds are used in amounts of 0.01 to 10, preferably 3 to 6, % by weight (calculated as 100% pure substance), relative to the total amount of copolymer and metal compound.

The mixture to be compacted contains 80-95 parts by weight of fibrous material and 5-20 parts by weight of adhesive.

The processing of the fibrous material mixed with the hot-melt adhesive is generally effected in heatable molds or presses. The temperature required for curing is 150°-240° C., preferably 180°-220° C., and depends on the duration of the heat treatment.

Examples of suitable fibrous material are shoddy, wood chips and shredded waste paper. It is particularly advantageous to use wastes from the processing of synthetic fibers, in particular fibers made of polyethylene terephthalate, generally referred to as polyester fibers, which are used in the form of shoddy. The ratio of shoddy to pulverulent adhesive is preferably 90:10 parts by weight.

Moldings prepared in accordance with the invention, such as insulating boards, roller blind boxes and half-shells for pipe insulation, produce high thermal and acoustic insulation. If the fibrous material used is shoddy from the polyester fibers, the moldings are also largely dimensionally stable to varying temperatures and humidities and their water absorption is low.

To prepare one 1 m² board of 10 mm thickness, for example 3.6 kg of shoddy from polyester spunbond wastes were mixed with 400 g of adhesive. The adhesive comprised 80 parts by weight of a mixture of 75.5 parts by weight of a commercially available copolymer of ethylene, vinyl acetate and N-methylolacrylamide (® Mowilith LDM 1160 P from Hoechst AG) and 4.5 parts by weight of butanediolate which is obtainable by reacting ethyl aluminoacetoacetate dissolved in isobutanol with butane-1,4-diol and working up to the solid product, 16 parts by weight of a polyglycidyl ether of bisphenol A having an epoxy equivalent of about 1,000 and 4 parts by weight of ethylene glycol bis-trimellitate. This mixture was compacted at 200° C. and 350 bar in a heated horizontal press for 5 minutes.

The resulting insulating board of 10 mm thickness had a weight per unit area of 4 kg/m², a thermal conductivity of 0.057 W/mK, a heat transmission resistance of 0.44 m² K/W and a footfall improvement factor, as measured by DIN 52,210, of 32 dB. The water absorption at 20° C. was $1.73 \times 10^{-2}\%$ by weight /% relative humidity. The thermal expansion coefficient at 50% relative humidity was found to be $1.53 \times 10^{-5} K^{-1}$ for the temperature range 0°−50° C. The board thus has high thermal and footfall insulation properties and is dimensionally very stable to varying temperatures and humidities.

We claim:

1. A process for preparing a molding which comprises mixing a) a fibrous material with b) a pulverulent mixture of a hot-melt adhesive based on copolymer of:
   1) vinyl ester,
   2) a carboxamide selected from the group consisting of an amide of acrylic acid, an amide of methacrylic acid, an N-methylol compound of either or a mixture of any of the preceding and
   3) at least one further vinyl monomer,
   c) a solid epoxy resin and d) a curing agent for the epoxy resin, and heating the mixture under pressure in a mold to a temperature at which the hot-melt adhesive becomes liquid and the epoxy resin reacts with its curing agent.

2. A process as claimed in claim 1, wherein one further vinyl monomer is ethylene.

3. A process as claimed in claim 1, wherein the hot-melt adhesive is a heat-crosslinkable copolymer of ethylene, vinyl acetate and N-methylolocrylamide in the presence of or absence of a metal compound of a dihydric alcohol of 2-6 carbon atoms.

4. A process as claimed in claim 1, wherein the epoxy resin is a polyglycidyl ether of bisphenol A having an epoxy equivalent of from 500 to 2,000.

5. A process as claimed in claim 1, wherein the pulverulent adhesive is composed of from about 65-80% by weight of the hot-melt adhesive and of from about 20 to 35% by weight of the mixture of epoxy resin and curing agent, the weight ratio of epoxy resin to curing agent being 70-90: 10-30.

6. A process as claimed in claim 1, wherein the temperature is from 150°-240° C.

7. A process as claimed in claim 3, wherein the metal compound is present in an amount of from 0.01 to 10% by weight, calculated as 100% pure substance, relative to the total amount of copolymer and metal compound.

8. A process as claimed in claim 1, wherein the fibrous material is shoddy from synthetic fiber 9. A process as claimed in claim 8, wherein the ratio of shoddy to pulverulent adhesive is 90:10 parts by weight.

10. A process according to claim 8 wherein the synthetic fiber is polyester fiber.

11. A pressure-molded and cured molding of an admixture of
   a) a fibrous material,
   b) a hot-melt adhesive based on a copolymer of
      1) vinyl ester,
      2) a carboxamide selected from the group consisting of an amide of acrylic acid, an amide of methacrylic acid, an N-methylol compound of either or a mixture of any of the preceding, and
      3) at least one further vinyl monomer,
   c) a solid epoxy resin, and
   d) a curing agent for the epoxy resin.

12. In producing insulating board in molded-resin form, the improvement wherein the molded resin is molding as claimed in claim 11.

13. In producing a roller blind box in molded-resin form, the improvement wherein the molded resin is molding as claimed in claim 11.

14. In producing a half-shell for pipe insulation in molded resin, the improvement wherein the molded-resin form is molding as claimed in claim 11.

15. A process as claimed in claim 3, wherein the hot-melt adhesive is a heat-crosslinkable copolymer in the absence of a metal compound of a dihydric alcohol of 2 to 6 carbon atoms.

16. A pressure-molded and cured molding as claimed in claim 11, wherein the carboxamide comprises an amide of acrylic acid.

17. A pressure-molded and cured molding as claimed in claim 11, wherein the carboxamide comprises an amide of methacrylic acid.

18. A pressure-molded and cured molding as claimed in claim 11, wherein the carboxamide comprises an N-methylol compound of an amide of acrylic acid.

19. A pressure-molded and cured molding as claimed in claim 11, wherein the carboxamide comprises an N-methylol compound of an amide of methacrylic acid.

20. A pressure-molded and cured molding as claimed in claim 11, wherein the carboxamide is a mixture of carboxamides.

* * * * *